US012194759B2

(12) United States Patent
Oota

(10) Patent No.: US 12,194,759 B2
(45) Date of Patent: Jan. 14, 2025

(54) PRINTED MATTER MANUFACTURING METHOD, THERMAL TRANSFER PRINTING DEVICE, DETERMINATION SYSTEM, AND PRINTED MATTER

(71) Applicant: Dai Nippon Printing Co., Ltd., Tokyo (JP)

(72) Inventor: Mitsuhiro Oota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 185 days.

(21) Appl. No.: 18/002,688

(22) PCT Filed: Aug. 2, 2021

(86) PCT No.: PCT/JP2021/028563
§ 371 (c)(1),
(2) Date: Dec. 21, 2022

(87) PCT Pub. No.: WO2022/030430
PCT Pub. Date: Feb. 10, 2022

(65) Prior Publication Data

US 2023/0241901 A1 Aug. 3, 2023

(30) Foreign Application Priority Data

Aug. 7, 2020 (JP) ................................ 2020-134748

(51) Int. Cl.
*B41J 2/325* (2006.01)
*B41M 5/50* (2006.01)

(52) U.S. Cl.
CPC .............. *B41J 2/325* (2013.01); *B41M 5/502* (2013.01)

(58) Field of Classification Search
CPC ................................ B41J 2/325; B41M 5/502
See application file for complete search history.

(56) References Cited

U.S. PATENT DOCUMENTS 7,037,561 B2 5/2006 Narita et al.
7,934,752 B2 5/2011 Saito et al.
(Continued)

FOREIGN PATENT DOCUMENTS

CN 1429711 A 7/2003
CN 110831777 A 2/2020
(Continued)

OTHER PUBLICATIONS

Chinese Office Action (with English translation) dated Jun. 1, 2024 (Application No. 202180048489.8).
(Continued)

*Primary Examiner* — Justin Seo
(74) *Attorney, Agent, or Firm* — BURR PATENT LAW, PLLC

(57) ABSTRACT

Micro characters are expressed by a thermal fusion transfer technique. In a printed matter manufacturing method, a printed matter is manufactured by heating a thermal transfer sheet in accordance with image data, the thermal transfer sheet including a base member, a release layer disposed on the base member and containing a wavelength conversion material that emits visible light with excitation by invisible light, and a thermally fusible ink layer disposed on the release layer, and by transferring the thermally fusible ink layer to a transfer-receiving body. In this method, the image data includes a first pattern and a second pattern. The second pattern is disposed on the first pattern and has a maximum width of a predetermined value or less.

6 Claims, 3 Drawing Sheets

(56) References Cited

U.S. PATENT DOCUMENTS

| | | | | |
|---|---|---|---|---|
| 2003/0003278 | A1* | 1/2003 | Narita .................... | B41M 5/345 428/195.1 |
| 2003/0117480 | A1 | 6/2003 | Shiraiwa | |
| 2009/0074948 | A1 | 3/2009 | Ihara et al. | |
| 2016/0078265 | A1 | 3/2016 | Pawlik et al. | |
| 2019/0315130 | A1 | 10/2019 | Kobayashi et al. | |
| 2020/0130394 | A1 | 4/2020 | Imakura et al. | |

FOREIGN PATENT DOCUMENTS

| | | | |
|---|---|---|---|
| JP | H06-031955 | A | 2/1994 |
| JP | 2000-272276 | A | 10/2000 |
| JP | 2003-340954 | A | 12/2003 |
| JP | 2004-195818 | A | 7/2004 |
| JP | 2004-294365 | A | 10/2004 |
| JP | 2004-306471 | A | 11/2004 |
| JP | 2005-288868 | A | 10/2005 |
| JP | 3153024 | U | 8/2009 |
| KR | 10-2019-0020832 | A | 3/2019 |

OTHER PUBLICATIONS

Extended European Search Report dated Jul. 11, 2024 (Application No. 21854465.8).
International Search Report and Written Opinion (Application No. PCT/JP2021/028563) dated Oct. 19, 2021.

* cited by examiner

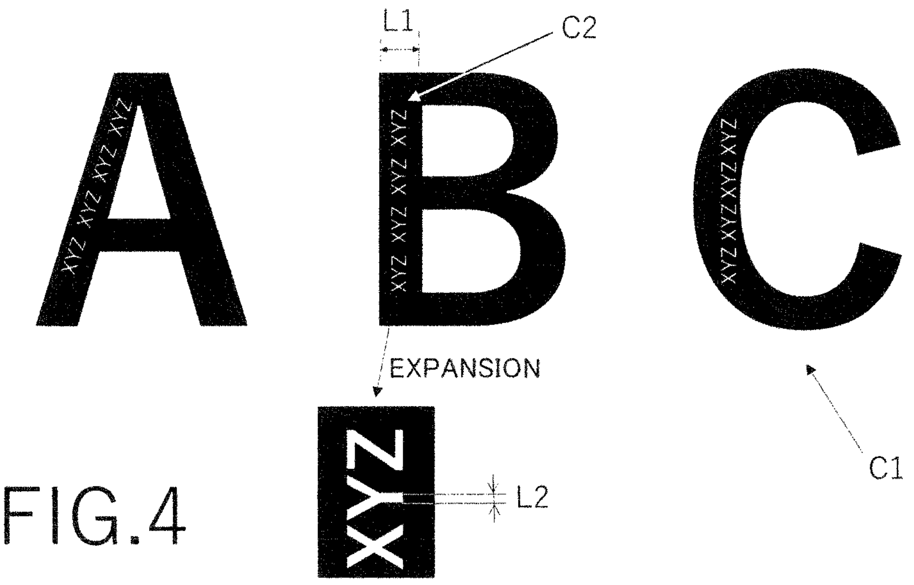
FIG.4
FIG.5
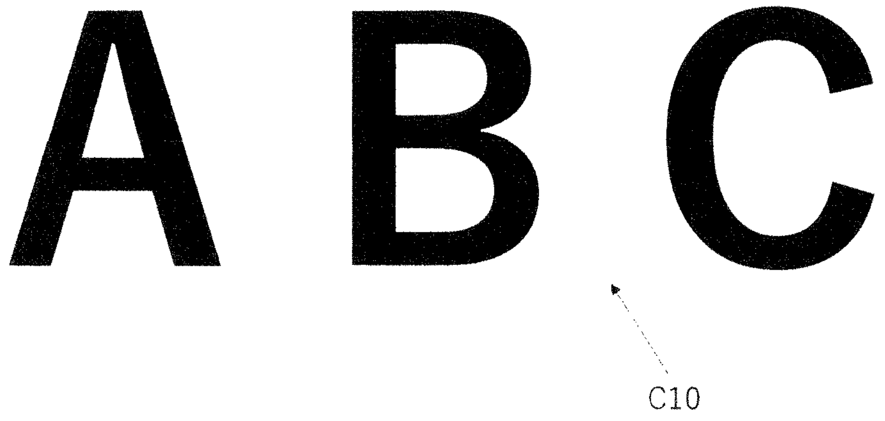

PRINTED MATTER MANUFACTURING METHOD, THERMAL TRANSFER PRINTING DEVICE, DETERMINATION SYSTEM, AND PRINTED MATTER

TECHNICAL FIELD

The present disclosure relates to a printed matter manufacturing method, a thermal transfer printing device, a determination system, and a printed matter.

BACKGROUND ART

A thermal transfer method has hitherto been known as a simple printing method. For example, there is known a sublimation thermal transfer technique for forming an image by laying a thermal transfer sheet with a dye layer containing a sublimable dye and an image receiving sheet one above the other, and by heating the thermal transfer sheet with a thermal head of a thermal transfer printer, thus causing the sublimable dye in the dye layer to be moved to the image receiving sheet.

Furthermore, there is known a thermal fusion transfer technique for forming an image by laying a thermal transfer sheet with a thermally fusible ink layer containing a thermally fusible ink and an image receiving sheet one above the other, and by heating the thermal transfer sheet with a thermal head of a thermal transfer printer, thus causing the thermally fusible ink layer to be transferred to the image receiving sheet. Because the image formed with the thermal fusion transfer technique has a high density and superior sharpness, the thermal fusion transfer technique is suitable for recording character patterns, line drawings, and so on.

Microcharacters are printed on, for example, a document or a card for which prevention of counterfeiting or tampering is demanded. A thermal head of a general thermal transfer printer has a resolution of 300 dpi (width of about 84 μm/dot), and when a pattern of 8×8 dots is used to express one character, a character with a size of about 1 mm can be printed according to theoretical calculation.

However, when the character with a minute size as small as about 1 mm is actually printed with the thermal fusion transfer technique, collapse of the printed character (transfer failure) is conspicuous, and the character is difficult to print in a legible state.

CITATION LIST

Patent Literature

PTL 1: JP H6-31955 A
PTL 2: JP 2004-306471 A

SUMMARY OF INVENTION

An object of the present disclosure is to provide a thermal transfer printing device and a printed matter manufacturing method each for expressing discernible micropatterns. Another object of the present disclosure is to provide a printed matter in which micropatterns are expressed and a determination system that performs determination of authenticity of a printed matter.

In the present disclosure, a printed matter manufacturing method of manufacturing a printed matter by heating a thermal transfer sheet in accordance with image data, the thermal transfer sheet including a base member, a release layer disposed on the base member and containing a wavelength conversion material that emits visible light with excitation by invisible light, and a thermally fusible ink layer disposed on the release layer, and by transferring the thermally fusible ink layer to a transfer-receiving body, wherein the image data includes a first pattern and a second pattern, the second pattern being disposed on the first pattern and having a maximum width of a predetermined value or less, and when the thermally fusible ink layer is transferred to the transfer-receiving body, a region in the thermal transfer sheet, the region corresponding to the first pattern except for the second pattern, is heated, a region therein corresponding to the second pattern is not heated, and the thermally fusible ink layer in a region corresponding to the first pattern and including the second pattern is transferred to the transfer-receiving body.

In the present disclosure, a thermal transfer printing device includes a thermal transfer unit configured to hold a thermal transfer sheet and a transfer-receiving body between a thermal head and a platen roll, the thermal transfer sheet including a base member, a release layer disposed on the base member and containing a wavelength conversion material that emits visible light with excitation by invisible light, and a thermally fusible ink layer disposed on the release layer, to heat the thermal transfer sheet by the thermal head in accordance with image data, and to transfer the thermally fusible ink layer to the transfer-receiving body from the thermal transfer sheet, and a control unit configured to transmit the image data to the thermal transfer unit, wherein the image data includes a first pattern and a second pattern, the second pattern being disposed on the first pattern and having a maximum width of a predetermined value or less, and the thermal head heats a region in the thermal transfer sheet, the region corresponding to the first pattern except for the second pattern, and does not heat a region therein corresponding to the second pattern.

In the present disclosure, a determination system includes an irradiation unit configured to apply invisible light to a printed matter manufactured by the method above, a photographing unit configured to take an image of the printed matter in which the wavelength conversion material emits light upon irradiation with the invisible light, and a determination device configured to compare a non-luminous pattern in the image taken by the photographing unit and information of the second pattern and to determine authenticity of the printed matter based on a comparison result.

In the present disclosure, a printed matter includes a base member, and a thermally fusible ink layer arranged on the base member, wherein the thermally fusible ink layer includes a first pattern that emits visible light with excitation by invisible light, and a second pattern that is arranged on the first pattern, that does not emit visible light with excitation by the invisible light or emits visible light with excitation by the invisible light, the visible light being weaker than the visible light emitted from the first pattern, and that has a maximum width of a predetermined value or less.

Advantageous Effects of Invention

According to the present disclosure, discernible micropatterns can be expressed with the thermal fusion transfer technique.

BRIEF DESCRIPTION OF DRAWINGS

FIG. 4 is an explanatory view of image data.

FIG. 5 illustrates a transfer pattern.

DESCRIPTION OF EMBODIMENTS

Figure 1:
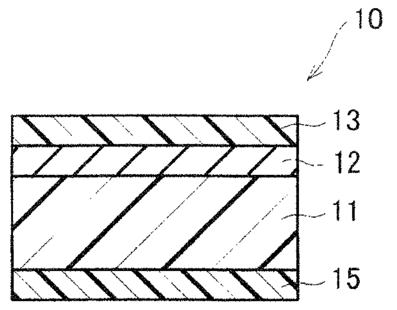
FIG. 1 is a sectional view of a thermal transfer sheet according to an embodiment of the present disclosure.

Embodiments will be described below with reference to the drawings. FIG. 1 is a sectional view of a thermal transfer sheet 10 according to an embodiment.

In the thermal transfer sheet 10, a release layer 12 and a thermally fusible ink layer 13 are successively laminated on one surface of a base member 11. Another coloring material layer, such as a dye layer, may be disposed on the one surface of the base member 11 in a different region. A back surface layer 15 is disposed on the other surface of the base member 11.

Figure 2:
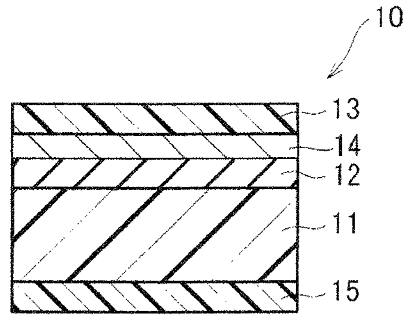
FIG. 2 is a sectional view of a thermal transfer sheet according to an embodiment of the present disclosure.

As illustrated in FIG. 2, a peeling layer 14 may be disposed between the release layer 12 and the thermally fusible ink layer 13.

The individual layers of the thermal transfer sheet 10 will be described below.

(Base Member)

Any type of known materials with a certain level of heat resistance and strength may be used as the base member 11 of the thermal transfer sheet 10. For example, resin films listed below can be used; namely, a polyethylene terephthalate film, a 1,4-polycyclohexylenedimethylene terephthalate film, a polyethylene naphthalate film, a polyphenylene sulfide film, a polystyrene film, a polypropylene film, a polysulfone film, an aramid film, a polycarbonate film, a polyvinyl alcohol film, cellophane, cellulose derivatives such as cellulose acetate, a polyethylene film, a polyvinyl chloride film, a nylon film, a polyimide film, an ionomer film, and so on. Instead of the resin films, papers such as condenser paper and paraffin paper, non-woven fabrics, or composites of papers or non-woven fabrics and resins can also be used. A thickness of the base member is preferably 0.5 μm or more and 50 μm or less and more preferably 3 μm or more and 10 μm or less.

(Release Layer)

The release layer 12 is disposed with intent to increase releasability of the thermally fusible ink layer 13 (or the peeling layer 14). The release layer 12 in this embodiment contains a resin material and a wavelength conversion material. Examples of the resin material include meth (acrylic) resin, polyurethane, acetal resin, polyamide, polyester, melamine resin, polyol resin, cellulose resin, silicone resin, and so on.

An example of the wavelength conversion material is a fluorescent whitener. The fluorescent whitener is a fluorescent agent that absorbs an ultraviolet ray and emits visible light in a range of a violet wavelength to a blue wavelength (including at least wavelengths of 400 nm or longer and 450 nm or shorter). For example, any of fluorescein compounds, thioflavin compounds, eosin compounds, rhodamine compounds, coumarin compounds, imidazole compounds, oxazole compounds, triazole compounds, carbazole compounds, pyridine compounds, imidazolone compounds, naphthalic acid derivatives, stilbenedisulfonate derivatives, stilbenetetrasulfonate derivatives, stilbene hexasulfonate derivatives, and so on can be used as the fluorescent whitener. Preferably, a material with the molecular weight of 800 or less is used for the fluorescent whitener.

The release layer 12 preferably contains the fluorescent whitener in a range of 5 wt % or more and 50 wt % or less in terms of dry weight.

The release layer may contain one or two or more types of release materials, such as silicone oil, a phosphate ester plasticizer, a fluorinated compound, a wax, a metal soap, and a filer.

A thickness of the release layer is not limited to a particular value and may be set in a range of, for example, 0.5 μm or more and 5.0 μm or less.

The release layer can be formed by applying a coating solution containing the above-mentioned resin material added with the above-mentioned fluorescent whitener onto the base member 11 with any of known means, such as a roll coating method, a reverse roll coating method, a gravure coating method, a reverse gravure coating method, a bar coating method, and a rod coating method, and by drying the applied coating solution.

(Thermally Fusible Ink Layer)

The thermally fusible ink layer 13 is a layer containing a coloring material and a binder that are known in the art. In practical use, various types of additives, such as mineral oil, vegetable oil, higher fatty acids including stearic acid, a plasticizer, thermoplastic resin, and a filler, are optionally added when necessary. A wax component used as the binder is, for example, microcrystalline wax, carnauba wax, or paraffin wax. Other various waxes, such as Fischer-Tropsch wax, various types of low-molecular-weight polyethylene, vegetable wax, beeswax, whale wax, Chinese wax (tree wax), wool wax, shellac wax, candelilla wax, petrolatum, polyester wax, partially modified wax, fatty acid esters, and fatty acid amides, are also usable.

Examples of a resin component used as the binder include an ethylene—vinyl acetate copolymer, an ethylene—acrylate ester copolymer, polyester, polyethylene, polystyrene, polypropylene, polybutene, petroleum resin, vinyl chloride resin, a vinyl chloride—vinyl acetate copolymer, polyvinyl alcohol, vinylidene chloride resin, acrylic resin, methacrylic resin, polyamide, polycarbonate, fluorocarbon resin, polyvinyl formal, polyvinyl butyral, acetyl cellulose, nitrocellulose, hydrophobically modified cellulose nanofibers, polyvinyl acetate, polyisobutylene, ethyl cellulose, polyacetal, and so on. Among those examples, the acrylic resin and the hydrophobically modified cellulose nanofibers are preferable.

The coloring material is not limited to a particular one and may be a dye or a pigment. Examples of the coloring material include red coloring materials such as cadmium red, cadmopone red, chrome red, vermillion, Bengala (red iron oxide), azo pigments, alizarin lake, quinacridone, and cochineal lake perylene, yellow coloring materials such as yellow ocher, aureolin (cobalt yellow), cadmium yellow, cadmium orange, chrome yellow, zinc yellow, Naples yellow, nickel yellow, azo pigments, and greenish yellow, blue coloring materials such as ultramarine, mountain blue, cobalt, phthalocyanine, anthraquinone, and indigoid, green coloring materials such as cinnabar green, cadmium green, chrome green, phthalocyanine, azomethine, and perylene, black coloring materials such as carbon black, white coloring materials such as silica, calcium carbonate, and titanium oxide, metallic pigments in particle or other shapes, such as aluminum, nickel, chromium, brass, tin, yellow brass, bronze, zinc, silver, platinum, gold, oxides of the above-mentioned metals, and metallized glasses, flaky alumina pigments coated with oxides of metals such as titanium, iron, zirconium, silicon, aluminum, and cerium, pearl pigments such as mica pigments, and so on.

To reduce melt viscosity of the thermally fusible ink layer, cellulose nanofibers may be mixed into the thermally fusible ink layer.

The thermally fusible ink layer can be formed by applying a coating solution for use in forming the thermally fusible ink layer, the solution being prepared through steps of mixing the coloring material, the binder component, and a solvent component, such as water or an organic dissolvent, when necessary and performing adjustment of a mixture, with any of known means, such as hot melt coating, hot lacquer coating, gravure coating, gravure reverse coating, and roll coating, and then by drying the applied coating solution. A thickness of the thermally fusible ink layer is about 1 μm or more and 20 μm or less.

(Peeling Layer)

The peeling layer 14 is to make the thermally fusible ink layer 13 easily peelable in a thermal transfer process and is a layer that is transferred to a transfer-receiving body together with the thermally fusible ink layer 13 in the thermal transfer process.

The peeling layer contains binder resin. Examples of the binder resin include vinyl resins such as polyvinyl chloride, polyvinyl acetate, polyvinyl alcohol (PVA), polyvinyl pyrrolidone, a vinyl chloride—vinyl acetate copolymer, and a vinyl acetate—vinyl pyrrolidone copolymer, polyesters such as polyethylene terephthalate, polybutylene terephthalate, and polyethylene naphthalate, polyamides such as nylon 6 and nylon 6,6, polyolefins such as polyethylene, polypropylene, and polymethylpentene, meth(acrylic) resins, and so on.

The peeling layer can be formed by dispersing or dissolving the above-mentioned material into water or an appropriate solvent to prepare a coating solution for use in forming the peeling layer, by applying the coating solution onto the release layer with any of known means such as a roll coater, a reverse roll coater, a gravure coater, a reverse gravure coater, a bar coater, and a rod coater, and by drying the applied coating solution.

(Back Surface Layer)

The back surface layer 15 is disposed on a surface (back surface) opposite to the surface of the base member 11 on which the release layer 12 and so on are disposed, and it serves to suppress thermal fusion adhesion between a heating device, such as a thermal head, and the base member and to smooth traveling of the printing device.

Examples of resin forming the back surface layer include polyvinyl butyral, polyvinyl acetoacetal, polyester, a vinyl chloride—vinyl acetate copolymer, polyether, polybutadiene, a styrene—butadiene copolymer, acrylic polyol, polyurethane acrylate, polyester acrylate, polyether acrylate, epoxy acrylate, a prepolymer of urethane or epoxy, nitrocellulose resin, cellulose nitrate resin, cellulose acetopropionate resin, cellulose acetate butylate resin, cellulose acetate hydrogen phthalate resin, cellulose acetate resin, polyamide, polyimide, polyamideimide, polycarbonate, chlorinated polyolefin, and so on.

The back surface layer may contain a slide accelerator and a filler (such as talc). Addition of those components can improve a sliding property between a transfer surface of the thermal transfer sheet and the buck surface (back surface layer) of the thermal transfer sheet and can suppress an increase in winding diameter attributable to, for example, wrinkles generated during winding-up. Examples of the slide accelerator include phosphate esters, silicone oil, graphite powder, and silicone polymers such as a silicone graft polymer, a graft fluoropolymer, an acrylic silicone graft polymer, acrylic siloxane, and aryl siloxane. Preferably, a polyol such as a polyalcohol high-molecular compound, a polyisocyanate compound, or a phosphate ester compound, for example, is used. More preferably, the filler is added to the back surface layer.

The back surface layer can be formed by dissolving or dispersing the above-mentioned resin, slide accelerator, and filler into an appropriate dissolvent to prepare an ink for use in forming the back surface layer, by coating the ink over the back surface of a base member film, and by drying the coated ink. The coating can be performed by, for example, a gravure printing method, a screen printing method, or a reverse coating method using a gravure plate. A thickness of the back surface layer is about 0.1 μm or more and 2 μm or less.

Figure 3:
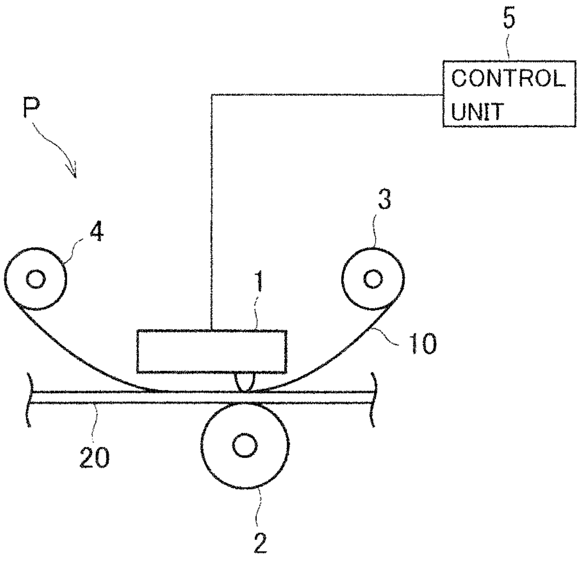
FIG. 3 is a schematic view of a configuration of a thermal transfer printing device.

FIG. 3 illustrates a schematic configuration of a thermal transfer printing device that forms an image by transferring the thermally fusible ink layer to a transfer-receiving body 20 with the use of the thermal transfer sheet 10 illustrated in FIGS. 1 and 2. The thermal transfer printing device includes a printing unit P and a control unit 5. The printing unit P heats the thermal transfer sheet 10 from a side including the back surface layer 15 in accordance with image data received from the control unit 5 and transfers the thermally fusible ink layer 13 to the transfer-receiving body 20 from the thermal transfer sheet 10. Thus, the image is formed, and a printed matter is manufactured. The transfer-receiving body 20 is not limited to a particular one and may be made of, for example, image receiving paper or a card base member in practical use.

In the printing unit P (thermal transfer unit), the thermal transfer sheet 10 is wound around a supply unit 3, and the thermal transfer sheet 10 unrolled from the supply unit 3 is recovered by being wound around a recovery unit 4 after passing a thermal head 1.

A rotatable platen roll 2 is disposed on an opposite side to the thermal head 1 with the thermal transfer sheet 10 positioned therebetween. The thermal transfer sheet 10 and the transfer-receiving body 20 are brought into a state held between the thermal head 1 and the platen roll 2.

The image data transmitted from the control unit 5 to the printing unit P is a combination of at least two types of patterns with different line widths. Those patterns include a first pattern with a first line width in the form of a line (linear or curved line) and a second pattern with a second line width smaller than the first line width, the second pattern being arranged on the line of the first pattern. The first pattern is given as a character, a symbol, or the like. The second pattern is not limited to a particular one and is given as a character, a symbol, an identifier, a barcode, a logo, an ID number, a company name, a username, an owner name, a design, an image, or a combination of some of the above-mentioned examples.

FIG. 4 illustrates an example of the image data. In the illustrated example, a second pattern C2 with a second line width L2 is disposed on a line of a first pattern C1 with a first line width L1. In the example illustrated in FIG. 4, the first pattern C1 is given as characters "ABC", and the second pattern C2 is given as characters "XYZ". The first pattern C1 is a pattern transferred to (or printed on) the transfer-receiving body 20 and corresponds to a region that is heated when the thermal head 1 transfers the thermally fusible ink layer to the transfer-receiving body 20. The first line width L1 is 254 μm (about 3 dots in terms of 300 dpi) or more.

The second pattern C2 is similar to the so-called hollow characters and corresponds to a region that is not heated when the thermal head 1 transfers the thermally fusible ink layer to the transfer-receiving body 20. Here, the second pattern C2 is a fine pattern with the second line width L2 of 28 μm or more and 170 μm or less (about 1 dot or more in terms of 900 dpi and 2 dots or less in terms of 300 dpi). Thus, even with the region forming the second pattern C2 being not heated, the thermally fusible ink layer in the region forming the second pattern C2 is also transferred to the transfer-receiving body 20 together with the thermally fusible ink layer in the heated region.

Therefore, when the thermal head 1 heats the thermal transfer sheet 10 and transfers the thermally fusible ink layer to the transfer-receiving body 20 in accordance with the image data illustrated in FIG. 4, a pattern C10 (characters ABC) not including the hollow characters (characters XYZ) corresponding to the second pattern C2 is formed on the transfer-receiving body 20 as illustrated in FIG. 5.

Upon the heating of the thermal transfer sheet 10 by the thermal head 1, the fluorescent whitener in the release layer 12 is transferred to the thermally fusible ink layer 13 through diffusion (or sublimation). Because the fluorescent whitener is transferred at a molecular level, the fluorescent whitener is transferred to the thermally fusible ink layer 13 only in the region heated by the thermal head 1 whereas the fluorescent whitener is not (or hardly) transferred to the thermally fusible ink layer 13 in the not-heated region corresponding to the second pattern C2. In a region within the first pattern C1 except for the second pattern C2, the thermally fusible ink layer 13 to which the fluorescent whitener has been transferred is transferred to the transfer-receiving body 20. In the region corresponding to the second pattern C2, the thermally fusible ink layer 13 to which the fluorescent whitener has not been transferred (namely, the thermally fusible ink layer 13 containing almost no fluorescent whitener) is transferred to the transfer-receiving body 20.

When the thermal transfer sheet 10 includes the peeling layer 14, the fluorescent whitener in the release layer 12 is transferred to the peeling layer 14. The peeling layer 14 to which the fluorescent whitener has been transferred is transferred to the transfer-receiving body 20 together with the thermally fusible ink layer 13.

Figure 6:
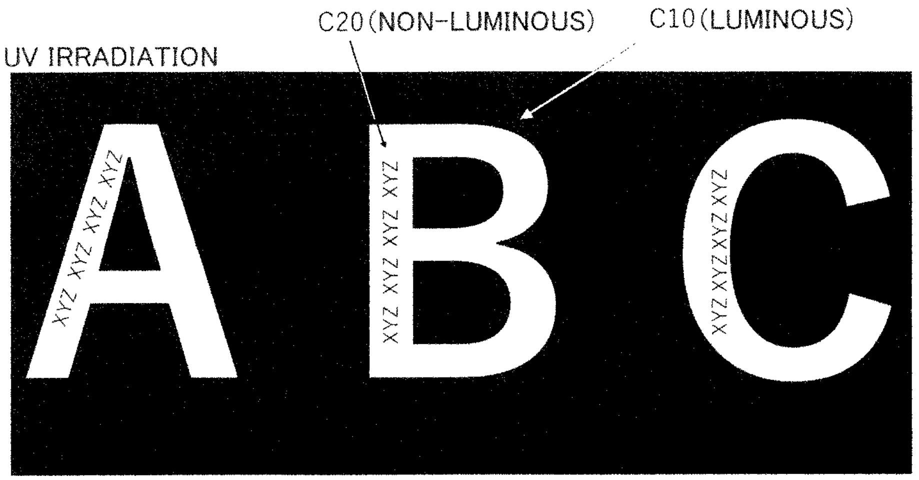
FIG. 6 illustrates a luminous pattern.

When a user looks at the transfer-receiving body 20 on which the pattern C10 (characters ABC) has been formed, therefore, the second pattern C2 (characters XYZ) is not visually recognized as illustrated in FIG. 5. Upon the transfer-receiving body 20 being irradiated with an ultraviolet ray, as illustrated in FIG. 6, fluorescence is emitted from the fluorescent whitener contained in the pattern C10 (characters ABC) such that the pattern C10 becomes luminous. On the other hand, the region corresponding to the second pattern C2 (characters XYZ) does not emit fluorescence (or emits fluorescence with smaller emission intensity than that of the pattern C10), and a non-luminous pattern C20 (characters XYZ) can be visually recognized.

Thus, because of formation of a fine pattern that cannot be visually recognized in a usual condition and that becomes visually recognizable upon irradiation with the ultraviolet ray, it is possible to increase a security level of the printed matter.

Figure 7:
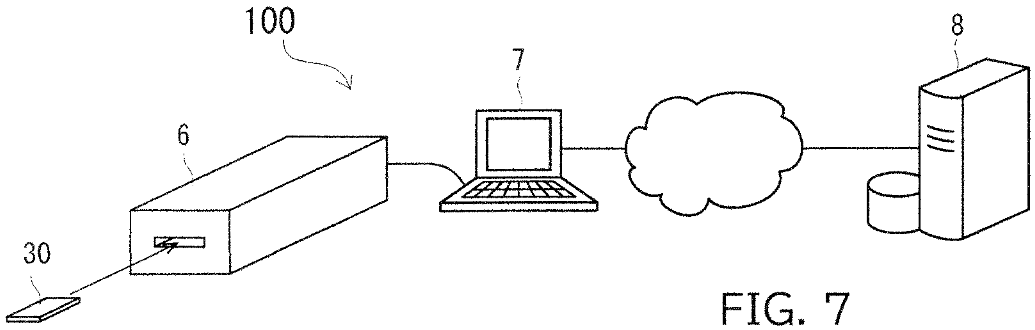
FIG. 7 is a schematic view of a configuration of a determination system.

Authenticity of the printed matter can be determined by using an authenticity determination system 100 illustrated in FIG. 7. The authenticity determination system 100 includes a pattern detector 6, a determination device 7, and a server device 8. The determination device 7 is connected to the pattern detector 6 and the server device 8 to be able to communicate with them.

Figure 8:
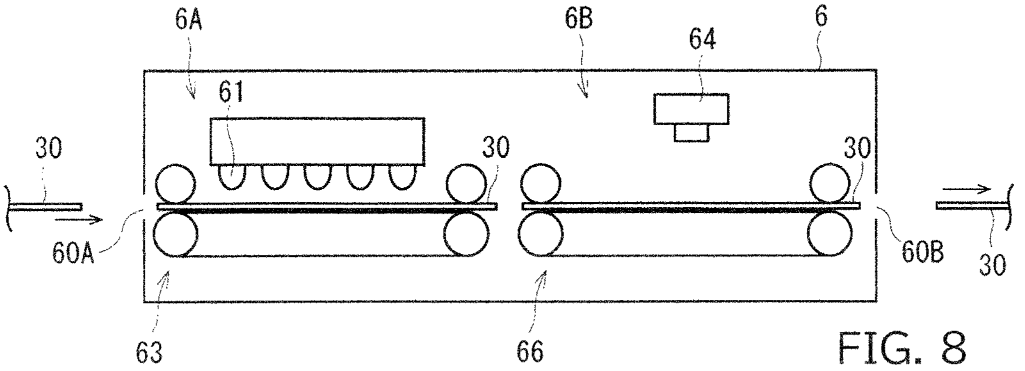
FIG. 8 is a schematic view of a configuration of a pattern detector.

As illustrated in FIG. 8, the pattern detector 6 includes a light irradiation unit 6A, a pattern detection unit 6B, and conveying units 63 and 66. The light irradiation unit 6A include a plurality of light emitting elements 61. The light emitting elements 61 each emit, for example, an ultraviolet ray.

A photographing unit 64 is disposed in the pattern detection unit 6B. The photographing unit 64 is, for example, a CCD camera.

The conveying units 63 and 66 include rollers, conveying belts, and so on, and convey a printed matter 30 inside the pattern detector 6. The printed matter 30 is the transfer-receiving body 20 on which the pattern C10 is formed.

The printed matter 30 inserted into the pattern detector 6 through an inlet 60A is conveyed to the light irradiation unit 6A by the conveying unit 63. The printed matter 30 is irradiated with the ultraviolet ray from the light irradiation unit 6A. Upon the irradiation with the ultraviolet ray, fluorescence is emitted from the fluorescent whitener contained in the pattern C10.

The printed matter 30 having been irradiated with the ultraviolet ray from the light irradiation unit 6A is conveyed to the pattern detection unit 6B by the conveying units 63 and 66. The photographing unit 64 takes an image of the luminous pattern (specifically, the non-luminous pattern surrounded by the luminous pattern) on the printed matter 30. After the taking of the image, the printed matter 30 is discharged through an outlet 60B.

The determination device 7 is a computer including a display unit, a central processing unit (CPU), a storage unit, and so on. A personal computer, a smartphone, a tablet terminal, or the like can be used as the determination device 7.

The determination device 7 obtains, from the pattern detector 6, a photograph image of the printed matter 30 taken by the photographing unit 64. The determination device 7 further obtains information of a non-transfer pattern of the fluorescent whitener (namely, the second pattern C2), that pattern being included in the pattern C10 formed on the printed matter 30, from the server device 8 via a network such as the Internet.

The determination device 7 compares the non-luminous pattern in the photograph image obtained from the pattern detector 6 and the non-transfer pattern of the fluorescent whitener obtained from the server device 8. If both the patterns are in match with each other, the determination device 7 determines that the printed matter 30 is authentic.

The image of the printed matter 30 may be taken by the photographing unit 64 before and after the irradiation with the ultraviolet ray. The image taken before the irradiation with the ultraviolet ray and the image taken after the irradiation with the ultraviolet ray are compared, whereby the non-luminous pattern is extracted.

While the above embodiment has been described in connection with the example using the image data in which the hollow characters with the second line width L2 are arranged on the line with the first line width L1, the image data may be prepared such that the first pattern C1 is formed as a solid-printed region in a circular or polygonal shape and the hollow characters with the second line width L2 are arranged in the solid-printed region. When the second pattern C2 is a sign, a figure, or the like, a maximum width of the second pattern C2 is set to be 28 μm or more and 170 μm or less (about 1 dot or more in terms of 900 dpi and 2 dots or less in terms of 300 dpi).

Instead of the thermally fusible ink layer 13, a transparent heat seal layer may be disposed on the thermal transfer sheet 10.

While the above embodiment has been described in connection with the example in which the thermally fusible ink layer 13 is transferred directly to the transfer-receiving body 20, the thermally fusible ink layer 13 may be first transferred to a transfer layer of an intermediate transfer medium, and the transfer layer may be then transferred to the transfer-receiving body. In such a case, a heat seal layer on the transfer layer of the intermediate transfer medium or the transfer-receiving body is preferably transparent.

While the above embodiment has been described in connection with the example in which the release layer 12 contains the fluorescent whitener, an organic compound (wavelength conversion material) that has the molecular weight of 800 or less and that is excited to emit visible light upon irradiation with invisible light such as an ultraviolet ray or an infrared ray can also be used without being limited to the fluorescent whitener. An optical up-conversion material or an organic nonlinear optical material can be used as the material that emits the visible light upon the irradiation with the infrared ray. A known fluorescent agent or phosphorescent agent can be used as the material that emits the visible light upon the irradiation with the ultraviolet ray.

Although the present invention has been described in detail with reference to particular embodiments, it will be apparent to those skilled in the art that various modifications may be made therein without departing from the spirit and scope of the present invention.

The present application is based on Japanese Patent Application No. 2020-134748 filed on Aug. 7, 2020, which is incorporated herein by reference in its entirety.

REFERENCE SIGNS LIST

10 thermal transfer sheet
11 base member
12 release layer
13 thermally fusible ink layer
14 peeling layer
15 back surface layer

The invention claimed is:

1. A printed matter manufacturing method of manufacturing a printed matter by heating a thermal transfer sheet in accordance with image data, the thermal transfer sheet including a base member, a release layer disposed on the base member and containing a wavelength conversion material that emits visible light with excitation by invisible light, and a thermally fusible ink layer disposed on the release layer, and by transferring the thermally fusible ink layer to a transfer-receiving body, wherein the image data includes a first pattern and a second pattern, the second pattern being disposed on the first pattern and having a maximum width of a predetermined value or less, and when the thermally fusible ink layer is transferred to the transfer-receiving body, a region in the thermal transfer sheet, the region corresponding to the first pattern except for the second pattern, is heated, a region therein corresponding to the second pattern is not heated, and the thermally fusible ink layer in a region corresponding to the first pattern and including the second pattern is transferred to the transfer-receiving body.

2. The printed matter manufacturing method according to claim 1, wherein the first pattern includes a line with a first line width, and the second pattern is arranged on the line.

3. The printed matter manufacturing method according to claim 2, wherein the second pattern is a pattern with a second line width smaller than the first line width.

4. The printed matter manufacturing method according to claim 1, wherein a peeling layer is disposed between the release layer and the thermally fusible ink layer.

5. A thermal transfer printing device comprising: a thermal transfer unit configured to hold a thermal transfer sheet and a transfer-receiving body between a thermal head and a platen roll, the thermal transfer sheet including a base member, a release layer disposed on the base member and containing a wavelength conversion material that emits visible light with excitation by invisible light, and a thermally fusible ink layer disposed on the release layer, to heat the thermal transfer sheet by the thermal head in accordance with image data, and to transfer the thermally fusible ink layer to the transfer-receiving body from the thermal transfer sheet; and a control unit configured to transmit the image data to the thermal transfer unit, wherein the image data includes a first pattern and a second pattern, the second pattern being disposed on the first pattern and having a maximum width of a predetermined value or less, and the control unit is configured to control the thermal head so that the thermal head heats a region in the thermal transfer sheet, the region corresponding to the first pattern except for the second pattern, and does not heat a region therein corresponding to the second pattern.

6. A determination system comprising:

an irradiation unit configured to apply invisible light to a printed matter manufactured by the method according to claim 1;

a photographing unit configured to take an image of the printed matter in which the wavelength conversion material emits light upon irradiation with the invisible light; and a determination device configured to compare a non-luminous pattern in the image taken by the photographing unit and information of the second pattern and to determine authenticity of the printed matter based on a comparison result.

* * * * *